Patented June 10, 1941

2,245,245

UNITED STATES PATENT OFFICE 2,245,245

LIQUID COATING COMPOSITION AND PROCESS OF MAKING SAME

George Alexander, Lynn, Mass., assignor to General Electric Company, a corporation of New York No Drawing. Application April 29, 1938, Serial No. 205,009

8 Claims. (Cl. 260—30)

This invention relates to liquid coating and impregnating compositions and to methods of making the same. More particularly it relates to, and has as a principal object to provide, various improvements and modifications in phenolic resin compositions in the form of liquid solutions and emulsions.

Phenolic resin varnishes used in manufacturing laminated materials heretofore usually have been made by reacting phenol, cresol or the like with an aqueous solution of an aldehyde, generally formaldehyde, in the presence of a suitable alkaline or acid condensing agent or catalyst. The reaction was carried out at an elevated temperature, for example at the boiling point of the solution (about 94° to 100° C.). After reacting the ingredients for a suitable period, the reaction product was dehydrated by applying heat or heat and vacuum. The dehydrated mass was dissolved in a suitable organic solvent, usually alcohol or a mixture of alcohol and benzene. The resulting varnish was used in making laminated articles in accordance with procedures now well known. In such a process the organic solvent serves to dilute the resin component and to put it in such state that it will coat and impregnate a fibrous sheet material uniformly. Unless solvent-recovery systems are employed, the solvent content of the composition is wholly lost when sheets impregnated with such varnish are dried. These losses add greatly to the cost of manufacturing laminated articles with such compositions.

The broad suggestion also has been made that phenolic resin compositions adapted for making laminated sheet material may be produced from a mixture of phenol or its homologues and formaldehyde or its polymers, or other aldehydes, by reacting the mixed components in the presence or absence of condensing or dehydrating agents, with or without applied heat, until the oily or viscous initial reaction product separates.

In my co-pending application Serial No. 94,800, filed August 7, 1936, now Patent No. 2,218,373, and assigned to the assignee of the present invention, I described an aqueous liquid coating composition made by reacting a phenol and an aqueous solution of an aldehyde, with the aldehyde in excess, in the presence of an inorganic alkaline catalyst. Laminated articles made with such a composition are odorless, and hence are especially adapted for refrigerator construction and similar uses where even slight odors in the structure are objectionable. Laminated articles so made, due to the catalyst used in preparing the varnish, are not suited for all applications, for example where greater flexibility of the laminated sheet material is desired.

In accordance with the present invention phenolic resin varnishes or liquid coating compositions are produced by reacting in the absence of applied heat, and specifically at a temperature not substantially exceeding 60° C. during all or almost all of the reaction time, a mixture of a phenol, an aqueous solution of an excess of aldehyde and, as a catalyst for the reaction, a nitrogen compound selected from the class consisting of ammonia and amines. The reaction is allowed to proceed for a period sufficient to produce a reaction product in which the potentially reactive resin does not substantially exceed 75 per cent. A modifying agent adapted to prevent layer separation of water from the liquid resinous composition is incorporated therewith, as will later be described.

In order that those skilled in the art better will understand how this invention may be carried into effect, the following specific example illustrative of an embodiment of the invention is given:

Example 1

| | Parts by weight |
|---|---|
| Cresol | 100 |
| Aqueous formaldehyde (37½%) | 100 |
| Aqueous ammonia (28%) | 8 |

Mix the cresol and the formaldehyde in the cold, that is, in the absence of applied heat, in a jacketed reaction vessel or kettle provided with stirring mechanism. While mixing, the stated amount of ammonia is added very slowly, for example over a period of about 15 to 20 minutes. The temperature will begin to rise. It is desirable to keep the temperature from rising above 60° C. for any prolonged period. Hence, when the temperature reaches 45° C., cold water should be run through the jacket of the kettle for about 15 to 20 minutes or until the temperature drops to 25° to 30° C. Agitation is continued for a suitable additional period of time, as for example about 15 to 20 hours, after which mixing is discontinued. The batch is allowed to remain undisturbed at room temperature (20° to 35° C.) until the oily layer which separates contains substantially not more than 75 per cent heat-hardenable (potentially reactive) resin and, preferably, less than about 70 per cent of such resin. This point generally will be reached within from about 2 to 4 days, or somewhat more or less depending upon the room temperature, the kind and the amount of catalyst employed, ratio between the phenol and the aldehyde, and other influencing factors.

Instead of first mixing the cresol and formaldehyde and slowly adding ammonia thereto as above described, the ammonia may be mixed with the formaldehyde, the mixture thereafter cooled, and the cresol finally added to the cooled ammonia-formaldehyde mixture. The subsequent procedure is substantially the same as above set forth. In both cases the mixed components are allowed to react undisturbed at room temperature until an optimum amount of water has separated, consideration being given in determining the optimum reaction period to the viscosity of the resin-containing layer. In other words, the reaction is not permitted to proceed to a point at which the resinous reaction product becomes objectionably high in viscosity.

I have found that losses of resin during treatment of fibrous sheet material are minimized if the aqueous resin composition is aged prior to use for an optimum period, for example about 7 to 10 days or longer. On aging, the liquid resinous composition tends to separate more water and to increase in viscosity. Hence, in accordance with one embodiment of the invention, the bottom or liquid resin layer is drained from the reaction vessel, being careful that a minimum of the aqueous layer goes with the resin layer, and a suitable solvent is incorporated with the liquid resin in an amount at least sufficient to prevent separation of any further water and to keep the mass from becoming excessively viscous. For example, I may incorporate with the aqueous resin composition from about 5 to 20 per cent, by weight of the whole, of a solvent such as methyl or ethyl alcohol, acetone or a mixture of alcohol and benzol (benzene) in, for example, about equal proportions. Preferably methyl or ethyl alcohol is employed, although any solvent for the resin which is miscible with water may be used. The content of alcohol or other solvent should be such that the varnish is clear. In all cases the minimum amount of solvent, necessary to attain the ends above stated, should be used.

In carrying this invention into effect an excess of aldehyde is employed, the ratio varying, for example, from 1.05 to 1.5 mols of aldehyde for each mol of phenolic body. Ammonia is the preferred catalyst. It is used advantageously in the form of aqueous ammonia of about 28 per cent strength and preferably in an amount corresponding to from about 5 to 10 per cent by weight of such ammonia for each 100 parts of phenolic body. The larger the amount of catalyst used, the shorter the reaction time and the more viscous the reaction product as compared with products reacted for the same length of time but with a lesser amount of catalyst. Hexamethylene tetramine may be used in place of ammonia with equally satisfactory results. Other amine catalysts also may be used, for example methyl amine, ethyl amine, ethylene diamine, triethylene tetramine, and the like. Such amines (alkyl derivatives of ammonia) generally require a longer reaction period than does ammonia or hexamethylene tetramine.

A varnish made in the manner above described and containing, for example, about 10 to 15 per cent by weight of ethyl alcohol has a comparatively high content of potentially reactive resin, being of the order of, for instance, about 62 to 67 per cent. Preferably the alcohol content is such that the varnish has a viscosity at 25° C. of 100 to 500 centipoises and a resin content of 63 to 65 per cent. At such viscosity and resin content, the varnish usually will have a specific gravity at 25° C. of from 1.070 to 1.080. Such a varnish has exceptional penetrating power; that is to say, it readily penetrates to the innermost parts of a fibrous sheet material. It is preferred for use when it is desired to make laminated material, for example gears, containing a relatively large percentage of resin. Gear teeth cut from laminated material so made are free from ragged or uneven edges, and show no delaminating tendencies. To make a low resin-content laminated material, the varnish should be diluted with more alcohol or other suitable organic solvent until the resin content is, for instance, about 50 to 56 per cent by weight of the varnish.

The main advantages of a process such as above described are as follows: (1) There is no limit to the size of the batch that may be prepared. (2) At the most, only a comparatively small amount of organic solvent is required as compared with the large amounts necessary with conventional resinous compositions of the phenolic type used in making laminated sheet material. (3) Workmen unskilled in varnish and resin manufacture are able to prepare the product, the advantage of which is obvious. (4) The process proceeds without temperature regulation or control except, possibly, for a short time after mixing the ingredients. This makes possible substantially decreased labor costs as compared with products obtained by reacting the components at elevated temperatures. (5) A more uniform reaction product is formed and undesirable by-products are avoided.

In accordance with another embodiment of my invention an aqueous emulsion of the phenol-aldehyde reaction product is formed. By such a procedure it is not necessary to employ any organic solvent whatever in the varnish, and an emulsified water varnish of lower resin content may be produced.

An illustrative example of a method of making such emulsified water varnishes follows:

*Example 2*

| | Parts by weight |
|---|---|
| Cresol | 100 |
| Aqueous formaldehyde (37½%) | 100 |
| Aqueous ammonia (28%) | 8 |
| Emulsifying agent | ½ to 5 |

Mix the cresol, formaldehyde and ammonia in accordance with such procedure as given by way of illustration under Example 1. After the initial reaction period, during which time the temperature is not allowed substantially to exceed 60° C. for any prolonged period, and preferably not above 45° C., the reaction is allowed to proceed further at room temperature (20° to 35° C.), preferably without stirring, for a suitable length of time, for instance about 24 hours. Thereafter, while stirring, add a small amount of a suitable emulsifying agent, for example ½ part by weight powdered gum ghatti or 1 part powdered gum arabic. The emulsion is formed immediately, but mixing is continued until all the gum has gone into solution. The emulsion is of the oil-in-water type, of fine texture, quite stable, and can be diluted with substantial proportions of water without disturbing the homogeneity of the emulsion. It contains, for example, about 49 to 54 per cent, usually 50 to 52 per cent, by weight of potentially reactive resin and practically all the water formed during the reaction and introduced with the reactants. Although after prolonged storage a small amount of water will separate from this emulsion, the separated water can be re-emulsified with the resin component merely by agitating the mass. To decrease resin losses in the use of the emulsion, preferably it is aged prior to use, for example for about 7 to 10 days or longer.

Although gum ghatti or arabic are preferred emulsifying agents, due to the stability of the emulsions which they form, other emulsifying agents also may be used. For example, gums such as karaya, theus and tragacanth all give very good emulsions, while emulsifying agents such as agaragar, Irish moss, gelatine, blood and egg albumins, and lecithin produce emulsions that are somewhat less satisfactory from the standpoint of stability.

A colloidal clay such as bentonite also may be used to form a stable emulsion, but the resultant emulsion is of the water-in-oil type. If water be added to such an emulsion, the resin component precipitates. The emulsion can be further diluted without separation of components only by using organic solvents for the resin. The procedure and formula employed in making the resinous composition and the emulsion are essentially the same as described under Example 2, with the exception that about 5 parts by weight of bentonite are employed instead of a gum.

To make laminated sheet material, a continuous sheet of fibrous material such as paper, cloth or the like is coated and impregnated with modified phenolic resin composition prepared as hereinbefore described. This may be done, for example, by passing the sheet material through a bath of such impregnating composition, by spraying or brushing the composition upon the sheet, or by any other suitable means. The coated and impregnated sheet material is dried to remove volatile liquid present therein. The dried sheets are superposed to form a laminated mass of any desired thickness. The mass is pressed in a hot hydraulic press at a temperature of, for example, about 140° to 160° C., and under a pressure of, for instance, about 1000 to 1500 pounds per square inch. Such heat and pressure is applied for a period sufficient to bond or cement the laminae firmly together and to convert the resin to the insoluble and infusible state. The laminated sheets have a wide variety of building and industrial applications, being particularly adapted for use in the manufacture of gears.

The terms "phenol" and "phenolic" as used in the specification and appended claims include within their meaning not only phenol ($C_6H_5OH$) itself, but also cresol, xylenols, and phenolic homologues and derivatives having at least one hydroxyl group in the molecule, as well as mixtures thereof. As the present invention is particularly advantageous in the preparation of compositions comprising cresol-formaldehyde resinous reaction products, cresol is the preferred phenolic component. Formaldehyde is the preferred aldehyde, but other aldehydes also may be used, for instance furfuraldehyde. Paraformaldehyde or other formaldehyde-yielding compounds likewise may be employed.

The term "ammonia" as used in the claims includes the compound $NH_3$ in any form in which it may be incorporated with the reactants, that is, whether formed in place or introduced in gaseous, liquid or solution state.

What I claim as new and desire to secure by Letters Patent of the United States is:

1. A process of making a liquid coating and impregnating composition which comprises forming a mixture comprising a phenol and an aqueous solution of a molecular excess of formaldehyde and, in addition thereto, a catalyst selected from the class consisting of ammonia and basic amines, causing partial reaction between the phenol and the formaldehyde while admixed with the said catalyst at a temperature not exceeding substantially 60° C., effecting further reaction between the components at room temperature for a period sufficient to produce a liquid reaction product containing not exceeding substantially 75 per cent by weight potentially reactive resin, separating the supernatant aqueous layer, and incorporating into the liquid reaction product thus produced an organic solvent which is miscible therewith to suppress any further layer separation of water therefrom.

2. A liquid coating and impregnating composition which is the product of the process of claim 1.

3. The method of preparing a liquid coating and impregnating composition which comprises forming a mixture of an aqueous solution of formaldehyde and a reactive phenolic body comprising cresol in the ratio of 1 mol of the said phenolic body to from 1.05 to 1.5 mols formaldehyde and, in addition thereto, ammonia as a catalyst for the reaction, causing partial reaction between the said phenolic body and the formaldehyde while admixed with the ammonia at a temperature not exceeding substantially 60° C., effecting further reaction between the components at a temperature of 20° to 35° C. for a period sufficient to produce a liquid reaction product containing not exceeding substantially 75 per cent by weight potentially reactive resin, separating the supernatant aqueous layer, and incorporating into the liquid reaction product thereby obtained an organic solvent which is miscible therewith to suppress any further layer separation of water therefrom.

4. A method as in claim 3 wherein the amount of organic solvent incorporated into the liquid reaction product constitutes from 5 to 20 per cent by weight of the whole.

5. A method as in claim 3 which includes the additional step of aging the solvent-containing composition prior to use.

6. A process of making a liquid coating and impregnating composition which comprises forming a mixture of cresol and an aqueous solution of formaldehyde in the ratio of 1 mol cresol to 1.05 to 1.5 mols formaldehyde and, in addition thereto, ammonia in an amount corresponding to about 5 to 10 per cent, by weight of the cresol, of aqueous ammonia containing about 28 per cent $NH_3$, causing partial reaction between the cresol and formaldehyde while admixed with the ammonia at a temperature not exceeding substantially 60° C., effecting further reaction between the components at a temperature of 20° to 35° C. for a period sufficient to produce a liquid reaction product containing not exceeding substantially 75 per cent by weight potentially reactive resin, separating the supernatant aqueous layer, and incorporating into the liquid reaction product thus produced an organic solvent which is miscible therewith to suppress any further layer separation of water therefrom.

7. A liquid coating and impregnating composition which is the product of the process of claim 6.

8. A process of making a liquid coating and impregnating composition which comprises forming a mixture of cresol and an aqueous solution of formaldehyde in the ratio of 1 mol cresol to from 1.05 to 1.5 mols formaldehyde and, in addition thereto, ammonia in an amount corresponding to about 5 to 10 per cent, by weight of the cresol, of aqueous ammonia containing about 28 per cent $NH_3$, causing partial reaction between the cresol and formaldehyde while admixed with the ammonia at a temperature not exceeding substantially 60° C., effecting further reaction between the components at room temperature for a period sufficient to produce a liquid reaction product containing not exceeding substantially 75 per cent by weight potentially reactive resin, separating the supernatant aqueous layer, and incorporating into the liquid reaction product thus produced from 5 to 20 per cent, by weight of the whole, of an organic solvent which is miscible therewith to suppress any further layer separation of water therefrom, and aging the solvent-containing composition prior to use.

GEORGE ALEXANDER.